(12) United States Patent
Chen

(10) Patent No.: US 6,669,137 B1
(45) Date of Patent: Dec. 30, 2003

(54) AIR VEHICLE HAVING ROTOR/SCISSORS WING

(76) Inventor: Zhuo Chen, 807 Hampton Crossing, Norcross, GA (US) 30093

(*) Notice: Subject to any disclaimer, the term of this patent is extended or adjusted under 35 U.S.C. 154(b) by 0 days.

(21) Appl. No.: 10/227,955

(22) Filed: Aug. 26, 2002

(51) Int. Cl.[7] ............................................... B64C 27/24
(52) U.S. Cl. ........................................................ 244/7 R
(58) Field of Search ............................ 244/34 R, 6, 12.1, 244/7 R, 7 A, 4 R, 46, 17.11, 35 R, 39; D12/326, 327

(56) References Cited

U.S. PATENT DOCUMENTS

| | | | |
|---|---|---|---|
| 2,249,026 A | * | 7/1941 | Mourning et al. |
| 2,650,666 A | * | 9/1953 | Dorand et al. |
| 2,879,013 A | | 3/1959 | Herrick |
| 2,941,749 A | * | 6/1960 | Sullivan et al. |
| 3,025,022 A | * | 3/1962 | Girard |
| 3,159,360 A | * | 12/1964 | Ryan et al. |
| 3,327,969 A | | 6/1967 | Head |
| 3,375,997 A | * | 4/1968 | Gist |
| 3,794,273 A | * | 2/1974 | Girard |
| 3,971,535 A | * | 7/1976 | Jones |
| 4,132,374 A | * | 1/1979 | Abell |
| 4,711,415 A | | 12/1987 | Binden |
| 5,454,530 A | | 10/1995 | Rutherford |

FOREIGN PATENT DOCUMENTS

| | | | | |
|---|---|---|---|---|
| DE | 1261764 | * | 2/1968 | .................... 244/6 |
| IT | 505188 | * | 12/1954 | .................... 244/46 |
| IT | 510430 | * | 1/1955 | .................... 244/46 |
| JP | 404317891 A | | 11/1992 | |

OTHER PUBLICATIONS

Name of Author: Zhuo Chen; Title: "Air Vehicle Having Scissors Wings"; Patent Application to USPTO Filled on Aug. 23, 2002 with Express Mail No. "EU 409126636 US".

* cited by examiner

*Primary Examiner*—Tien Dinh (57) ABSTRACT

An air vehicle, such as a manned or unmanned air vehicle, has a fuselage, a rotor/scissors wing, and a scissors wing. At helicopter mode, the rotor/scissors wing rotates to make the air vehicle fly like a helicopter to achieve vertical and/or short take-off and landing, hovering, and low speed flying. At airplane mode, the rotor/scissors wing and scissors wing form a scissors wings configuration to maximize the air vehicle's flying efficiency at a wide range of speed and flying conditions by adjusting the yaw angle of the rotor/scissors wing and scissors wing. During the conversion from helicopter mode to airplane mode, the scissors wing generates lift to offload the rotating rotor/scissors wing and eventually the offloaded rotor/scissors wing's rotating speed is slowed and stopped so that the rotor/scissors wing can be locked at a specific position and the conversion can be achieved. In a reverse order, the air vehicle can convert from airplane mode to helicopter mode. Either turbofan or turbojet engine, or turboshaft/turbofan convertible engine can be used to power the air vehicle.

14 Claims, 5 Drawing Sheets

AIR VEHICLE HAVING ROTOR/SCISSORS WING

CROSS-REFERENCE TO RELATED APPLICATIONS

This patent is an improvement of my patent titled "Air Vehicle Having Scissors Wings" with U.S. Pat. No. 6,601,795B1 and Date of Patent Aug. 5, 2003.

FEDERALLY SPONSORED RESEARCH

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

1. Field of Invention

The invention relates to air vehicles such as manned and unmanned air vehicles and, in particular, to air vehicles that can fly both in helicopter mode and airplane mode to achieve vertical and/or short take-off and landing (V/STOL) and improve their flying efficiency at a wide range of speed and flying conditions.

2. Description of Prior Art

Various attempts have been made to combine helicopter's excellent capability of vertical and/or short take-off and landing and fixed-wing aircraft's ability of flying at a wide range of speed.

U.S. Pat. No. 5,454,530 "Canard Rotor/Wing" issued to J. W. Rutherford et al invents an aircraft utilizing a jet-propelled rotor/wing, preferably having two blades, to achieve V/STOL when it is in helicopter mode. During the conversion from the helicopter mode to airplane mode, the aircraft utilizes its canards and horizontal tail to generate most of the lift to offload the rotating rotor/wing. Afterwards, the rotating speed of the rotor/wing is slowed down and eventually stopped so that the aircraft is in airplane mode with the two blades of the rotor/wing become the left and right wing of the aircraft. When flying in airplane mode, the rotor/wing can operate like an oblique wing to maximize flight efficiency at different speeds.

A disadvantage of this invention is that different requirements to the canards and horizontal tail at different flying conditions force these aerodynamic surfaces to compromise their key parameters. The canards and horizontal tail should generate almost all the lift for the aircraft during the conversion between helicopter mode and airplane mode, but they are mainly used as control surfaces at other flying stages. As the canards and horizontal tail should be large enough to generate almost all the lift for the aircraft but they are mainly used as control surfaces at airplane mode, they make the aircraft inefficient at airplane mode.

U.S. Pat. No. 3,327,969 "Convertible Aircraft" issued to R. E. Head is an invention also utilizes a jet-propelled rotor/wing. During V/STOL, the rotor/wing rotates like a helicopter and generates lift with three stub blades installed on a big center body of the rotor/wing. During the conversion between helicopter mode and airplane mode, the big center body generates lift while the rotor/wing stops or begins to rotate. At airplane mode, the center body and two of the three stub blades generate lift for the aircraft.

This invention has a disadvantage of low flying efficiency. The relatively small and low aspect ratio stub blades are not efficient in generating lift at helicopter mode. In addition, the center body, which has a very small aspect ratio, has to generate almost all the lift during the conversion between helicopter mode and airplane mode. As the conversion should be made at a low speed, this low aspect ratio center body has to have large area to generate enough lift because its lift-to-drag ratio (L/D) is low. Furthermore, at airplane mode, one of the three stub blades is located with its long axis generally parallel with the longitudinal axis of fuselage, generating little lift.

Patent JP 404317891A "Aircraft For Vertical Take-Off And Landing" issued to H. Hatano is an invention utilizing two sets of rotor/wings that can convert between rotors and fixed wings. The two sets of rotor/wings are either mounted above the fuselage of an aircraft in tandem with one rotor/wing in front of another, or co-axially installed above the fuselage with one rotor/wing above another. During take-off, landing, and low speed flying, the rotor/wings rotate in opposite directions to make the aircraft fly like a helicopter. At high speed, both of the rotor/wings stop rotating to become fixed wings and the yaw angles of both fixed wings can be changed to fit different speeds.

One disadvantage of this invention is its complexity. When both of the rotor/wings are installed co-axially above the fuselage, the hub of the rotor/wings should contain mechanisms to control the collective pitch and cyclical pitch of the two counter-rotating rotor/wings at helicopter mode and the sweep angles of both of the rotor/wings at airplane mode. Having so many control mechanisms, the hub is not only complex but also difficult to have small size thus generates considerable drag during high-speed flights.

Another disadvantage is poor controllability and stability. During the conversion between helicopter mode and airplane mode, both of the rotor/wings have to keep generating lift to support the aircraft while they are being stopped or started to rotate, making the aircraft difficult to have good controllability and stability during the conversion.

X-wing configuration, as shown in U.S. Pat. No. 4,711,415 "X-Wing Helicopter-Scout Attack Configuration" issued to J. A. Binden, consists of a rotor/wing that can rotate as a rotor at helicopter mode and a fixed "X" shaped wing at airplane mode. The fixed sweep angles of the blades of the X-wing are affected by the requirements of helicopter mode, making them usually be a 45-degree sweep-forward angle for two blades and a 45-degree sweepback angle for the other two blades. These fixed sweep angles make a X-wing aircraft difficult to achieve efficient flying at a wide range of speed at airplane mode.

U.S. Pat. No. 2,879,013 "Convertible Aircraft" issued to G. P. Herrick is an invention utilizing a straight rotor/wing and a straight fixed wing. At helicopter mode, the straight rotor/wing rotates like a two-blade rotor of a helicopter. At airplane mode, the rotor/wing is stopped and together with the fixed wing, forming a configuration similar to a biplane. This invention cannot make an aircraft fly at high speed because the two straight wings can generate huge drag at high speed flying.

BRIEF SUMMARY OF THE INVENTION

The fundamental object and advantage of my invention is to build an air vehicle that can efficiently and effectively achieve V/STOL and fly at a wide range of speed up to supersonic speed. Specifically, the objects and advantages of an air vehicle based on my invention are:

1. Have V/STOL capability;
2. Can easily convert between helicopter mode and airplane mode;
3. Can efficiently and effectively fly at a wide range of speed up to supersonic speed;
4. Can fly at transonic and low supersonic speed without generating sonic boom.

A rotor/scissors wing configuration has been invented to achieve the above-mentioned objects and advantages. The invention has a fuselage, a rotor/scissors wing, and a scissors wing. The rotor/scissors wing is installed above the fuselage and the scissors wing is rotatably mounted on the fuselage. The following paragraphs explain how can the invention realize the above-mentioned four objects and advantages.

First, an air vehicle based on the invention can have V/STOL capability. At helicopter mode, the rotor/scissors wing rotates in a way similar to rotors of helicopters. There are two ways to drive the rotation of the rotor/wing. The first way is to direct the exhaust gas from at least one turbofan or turbojet engine to the jet nozzles located on the rotor/scissors wing to propel it to rotate. Another way is to transmit the shaft power generated by at least one turboshaft/turbofan convertible engine via a transmission system to drive the rotor/scissors wing to rotate. Tested on engines like the turboshaft/turbofan convertible engine based on a modified General Electric TF34 engine, turboshaft/turbofan convertible engines can work at both turbofan mode to provide thrust and turboshaft mode to provide shaft power.

When using the exhaust gas from turbofan or turbojet engines, the rotating rotor/scissors wing generates little, if any, torque moments on the air vehicle thus no anti-torque device like tail rotor is required. However, in order to achieve yaw control of the air vehicle at V/STOL, hovering, and very low speed flying, a small fan, or rotor, or thruster is required for air vehicles using turbofan or turbojet engines. When using turboshaft/turbofan convertible engines to drive the rotor/scissors wing to rotate, an anti-torque device like a fan, a rotor, or a thruster is required. This anti-torque device is also used to gain the yaw control of the air vehicle during V/STOL, hovering, and low speed flying. The pitch and roll control of the air vehicle under both of the engine arrangements can be achieved by adjusting the cyclic pitch and collective pitch of the rotating rotor/scissors wing similar as helicopters. These engine arrangements and control methods can ensure the air vehicle to achieve V/STOL, hovering, and low speed flying like a helicopter.

Second, an air vehicle based on the invention can easily convert between helicopter mode and airplane mode. After take-off, the rotating rotor/scissors wing accelerates the air vehicle in helicopter mode. With speed increasing, the scissors wing generates more and more lift, offloading the rotating rotor/scissors wing. In the mean time, more and more engine power is used to directly generate thrust to propel the aircraft instead of rotating the rotor/scissors wing. Finally, all of the engine power is used to directly propel the air vehicle and the rotor/scissors wing is slowed down and locked at a position where its long axis is generally perpendicular to the longitudinal axis of the fuselage, virtually forming a biplane together with the scissors wing. Similarly but in a reverse order, the air vehicle can convert from airplane mode to helicopter mode. The stopping and starting of rotation of the rotor/scissors wing do not change or disturb the center of lift of the air vehicle because it generates none or little lift, making the air vehicle easy to control and have good stability during the conversion.

Third, an air vehicle based on the invention can efficiently and effectively fly at a wide range of speeds up to supersonic speed. At airplane mode, the air vehicle is of scissors wings configuration with the rotor/scissors wing acting as another scissors wing. By adjusting the yawing angle of both the rotor/scissors wing and scissors wing, the air vehicle can maximize its flying efficiency at virtually any speed within its flight envelope. When yawed to a big angle from perpendicular to fuselage, the cross-sectional areas of both the rotor/scissors wing and scissors wing are generally evenly distributed along the longitudinal axis of the fuselage, making the air vehicle very easy to conform to the "area rule" for transonic and supersonic flying. This feature makes the air vehicle have low transonic and supersonic drag thus have high efficiency in transonic and supersonic flying as well as subsonic flying.

Different from the canard rotor/wing configuration of U.S. Pat. No. 5,454,530, the scissors wing of this invention is used to generate lift during the entire course of flying except hovering, vertical take-off and landing, and very low speed flying. This makes the air vehicle more efficient than canard rotor/wing configuration whose canards and horizontal tail generate lift only in the conversion between helicopter mode and airplane mode and are used mainly as control surfaces at airplane mode.

Forth, an air vehicle based on the invention can fly at transonic and low supersonic speed without generating sonic boom. When yawed at a big angle from perpendicular to fuselage, the supersonic drag characteristics of an air vehicle with scissors wings is similar to that of an air vehicle with oblique wing because both have similar cross-sectional area distribution along the longitudinal axis of fuselage, and both are composed of generally straight and continuous wing or wings yawing at an angle. According to U.S. Pat. No. 3,971,535 "Oblique-Wing Supersonic Aircraft" issued to R. T. Jones, oblique wing configuration can make an air vehicle fly up to Mach 1.3 without generating sonic boom. As the scissors wings configuration has similar supersonic drag characteristics as oblique wing configuration, air vehicle with rotor/scissors wing can also fly at transonic and low supersonic speeds without generating sonic boom. This feature makes an air vehicle with rotor/scissors wing able to fly over population centers at a supersonic speed without disturbing people on the ground.

BRIEF DESCRIPTION OF THE SEVERAL VIEWS OF THE DRAWING

In the drawings, closely related figures have the same number but different alphabetic suffixes.

DETAILED DESCRIPTION OF THE INVENTION—PREFERRED EMBODIMENT

Figure 1A:
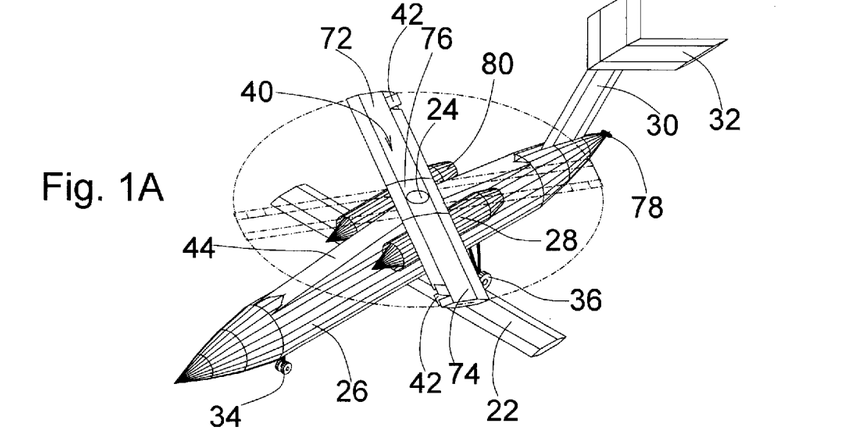
FIG. 1A shows an isometric view of an aircraft of rotor/scissors wing configuration using turbofan or turbojet engines in helicopter mode to achieve V/STOL, hovering, and low speed flying with its rotor/scissors wing rotating and scissors wing yawed to be generally perpendicular to the longitudinal axis of the fuselage of the aircraft.

As shown in FIG. 1A, an aircraft with rotor/scissors wing is at helicopter mode in the condition of V/STOL, hovering, or low speed flying. Rotor/scissors wing 40 is installed above fuselage 26 via shaft 24. Fairing 44 is constructed between rotor/scissors wing 40 and fuselage 26 to reduce drag and contain systems like engine power transmission system and control system. Rotor/scissors wing 40 consists of a hub 76 and two blades 72 and 74. The pitch angles of blades 72 and 74 can be adjusted by mechanisms installed in hub 76. As indicated in the figure, two jet nozzles 42 are located on both wingtips of rotor/scissors wing 40. In this figure, both of the jet nozzles 42 are open, propelling rotor/scissors wing 40 to rotate. The figure also shows one of the many ways to install engine or engines on the aircraft. In the figure, two engine nacelles 28 are installed on fairing 44 to shorten the route of sending engine exhaust gas to jet nozzles 42. Scissors wing 22 is rotatably mounted beneath fuselage 26. In this figure, scissors wing 22 is yawed to be generally perpendicular to the longitudinal axis of fuselage 26. The aircraft also has a vertical stabilizer 30 and a pair of horizontal stabilizers 32. Also as shown in the figure, nose landing gear 34 and main landing gears 36 are stretched out from fuselage 26. Main landing gears 36 are located behind scissors wing 22 so that they can be stretched out from and retracted back to fuselage 26 when scissors wing 22 is generally perpendicular to fuselage 26 during V/STOL, hovering, and low speed flying.

In order to gain yaw control of the aircraft at helicopter mode, a two-direction thruster 78 is installed at the tail of fuselage 26. Thruster 78 also utilizes engine exhaust gas to control the direction of the aircraft. As the jet-propelled rotor/scissors wing generates little, if any, torque to rotate the fuselage and vertical tail 30 can achieve yaw control after the aircraft accelerates to a certain speed, thruster 78 can be small and consumes a very small part of engine power.

Roll control and pitch control of the aircraft at helicopter mode can be achieved by adjusting the cyclic and collective pitch of blades 72 and 74 of rotor/scissors wing 40 similar to conventional helicopters. The cyclic and collective pitch control system can be installed in hub 76.

FIG. 1A also indicates how the aircraft converts between helicopter mode and airplane mode. When the aircraft gains a certain speed at helicopter mode, scissors wing 22 is able to generate lift to offload the rotating rotor/scissors wing 40 and some of the engine exhaust gas that was directed to rotate rotor/scissors wing 40 can be diverted to pass through conventional engine nozzles 80 to directly propel the aircraft. With speed further increasing, rotor/scissors wing 40 is increasingly offloaded by scissors wing 22 until finally, all the lift is generated by scissors wing 22 and all the engine exhaust gas are released from conventional engine nozzles 80. Under this condition, the totally offloaded rotor/scissors wing 40 can be stopped rotating and locked to be generally perpendicular to the longitudinal axis of fuselage 26, making the aircraft convert to airplane mode. In a reverse order, the aircraft can convert from airplane mode to helicopter mode.

Figure 1B:
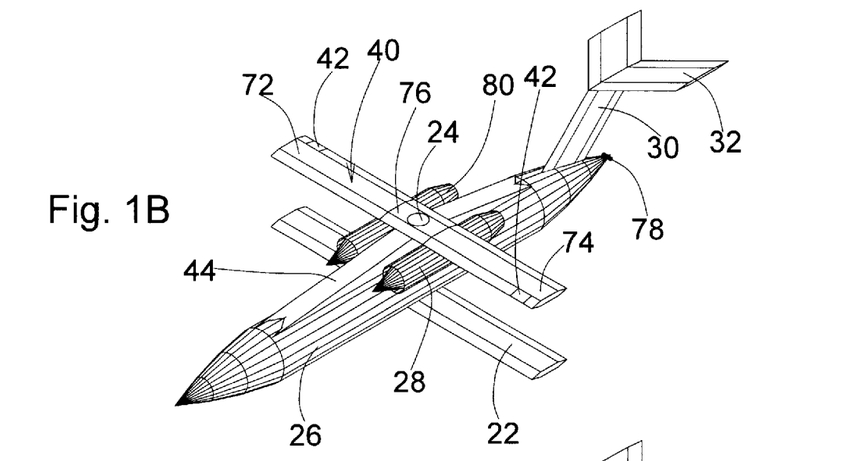
FIG. 1B shows an isometric view of the aircraft described in FIG. 1A in the condition of flying at low speed in airplane mode with both rotor/scissors wing and scissors wing being yawed to be generally perpendicular to the longitudinal axis of the fuselage of the aircraft.

In FIG. 1B, the aircraft has just converted from helicopter mode to fixed wing mode. Jet nozzles 42 are closed, and rotor/scissors wing 40 and scissors wing 22 form a biplane configuration. Scissors wing 22 has flaps and ailerons or flaperons (not shown in the figure) to adjust its lift and achieve roll control of the aircraft. Rotor/scissors wing 40 can adjust the pitch angles of its blades 72 and 74 to adjust lift and achieve roll control of the aircraft. Lift-generating devices such as flaps and/or flaperons and/or control surfaces such as ailerons can also be installed on rotor/scissors wing 40 (not shown in the figure). If the lift-generating devices and/or control surfaces are installed, rotor/scissors wing 40 can either use them or adjust the pitch angles of its blades 72 and 74 or utilize both of these methods to adjust lift and achieve roll control of the aircraft. Horizontal tails 32 can be used to realize pitch control of the aircraft and vertical tail 30 can be used for yaw control.

Figure 1C:
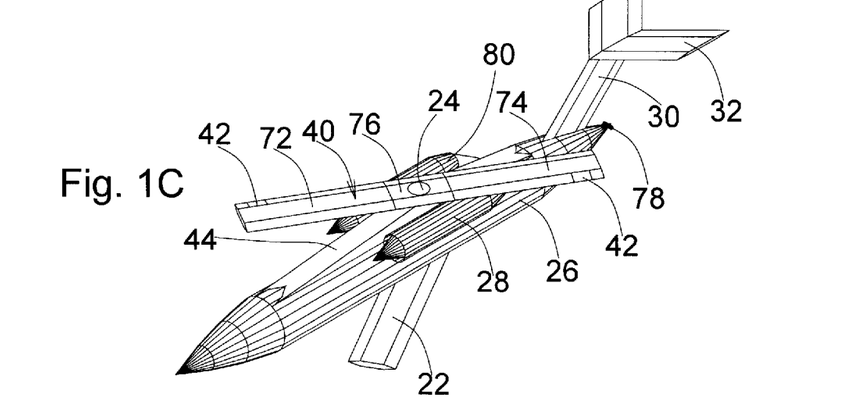
FIG. 1C shows an isometric view of the aircraft described in FIG. 1A in the condition of flying at high speed in airplane mode with both rotor/scissors wing and scissors wing being yawed to a big angle between zero degree to 90 degrees from perpendicular to fuselage to maximize lift-to-drag ratio (L/D) of the aircraft.

FIG. 1C, the aircraft accelerates to a high speed. As shown in the figure, both rotor/scissors wing 40 and scissors wing 22 are yawed at a big angle from perpendicular to fuselage to maximize flying efficiency of the aircraft. This figure also shows that when rotor/scissors wing 40 and scissors wing 22 are yawed at a big angle, the cross-sectional area of both of them are generally evenly distributed along the longitudinal axis of fuselage 26, making the aircraft easy to be arranged to conform to the "area rule" of transonic and supersonic flying.

Figure 2A:
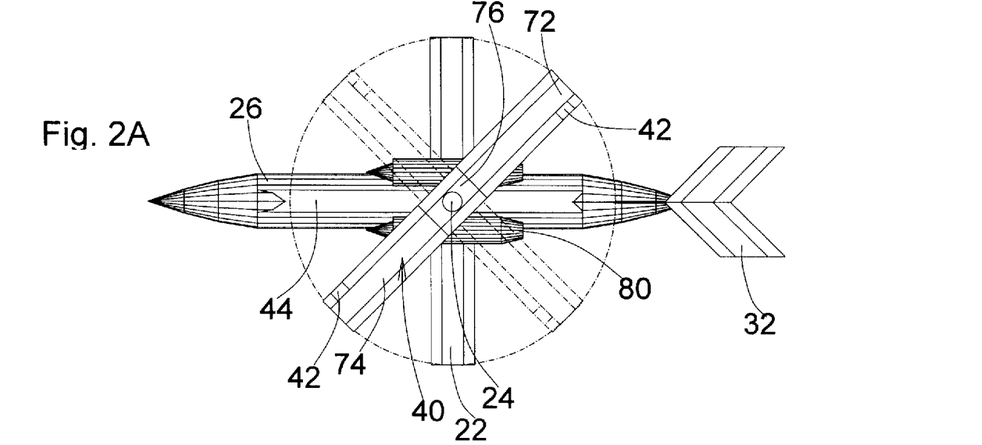
FIG. 2A shows a top plan view of the aircraft described in FIG. 1A in helicopter mode to achieve V/STOL, hovering, and low speed flying with its rotor/scissors wing rotating and scissors wing being yawed to be generally perpendicular to the longitudinal axis of the fuselage of the aircraft.
Figure 2B:
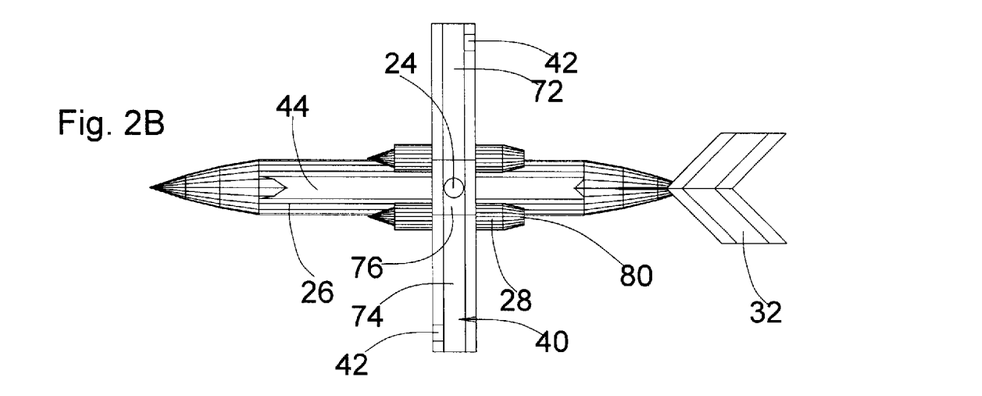
FIG. 2B shows a top plan view of the aircraft described in FIG. 1A in the condition of flying at low speed in airplane mode with both rotor scissors wing and scissors wing being yawed to be generally perpendicular to the longitudinal axis of the fuselage of the aircraft.
Figure 2C:
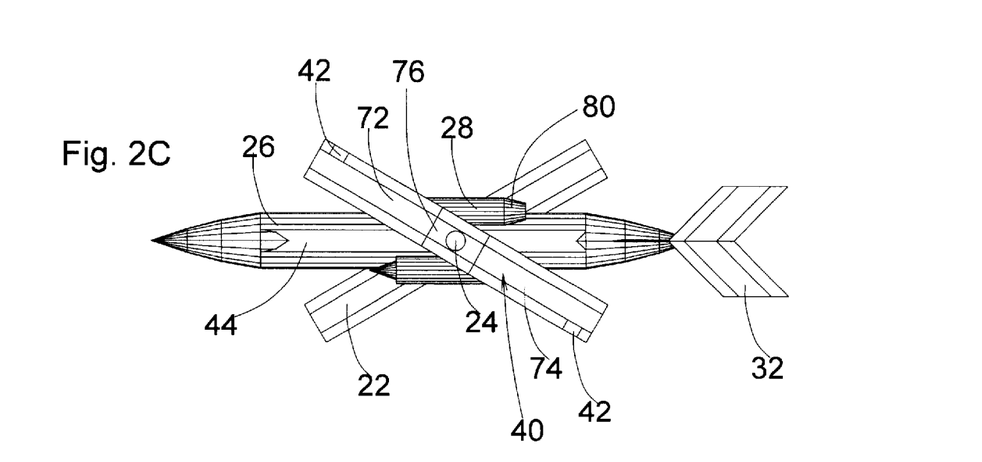
FIG. 2C shows a top plan view of the aircraft described in FIG. 1A in the condition of flying at high speed in airplane mode with both rotor scissors wing and scissors wing being yawed to a big angle between zero degree to 90 degrees from perpendicular to fuselage to maximize lift-to-drag ratio (L/D) of the aircraft.

In order to clearly show how the rotor/scissors wing configuration works, FIG. 2A to FIG. 2C show the top plan views of the aircraft at different conditions.

In FIG. 2A, the aircraft is in the condition of V/STOL, hovering, and low speed flying. Engine exhaust gas is released from both jet nozzles 42 to propel rotor/scissors wing 40 to rotate so that the aircraft can fly like a helicopter.

FIG. 2B and FIG. 2C show the aircraft flying at airplane mode. In FIG. 2B, the aircraft is flying at low speed with both rotor/scissors wing 40 and scissors wing 22 being generally perpendicular to the longitudinal axis of fuselage 26. In FIG. 2C, the aircraft is flying at a high speed with both rotor/scissors wing 40 and scissors wing 22 being yawed to a big angle from perpendicular to fuselage to maximize flight efficiency at this speed.

Figure 3:
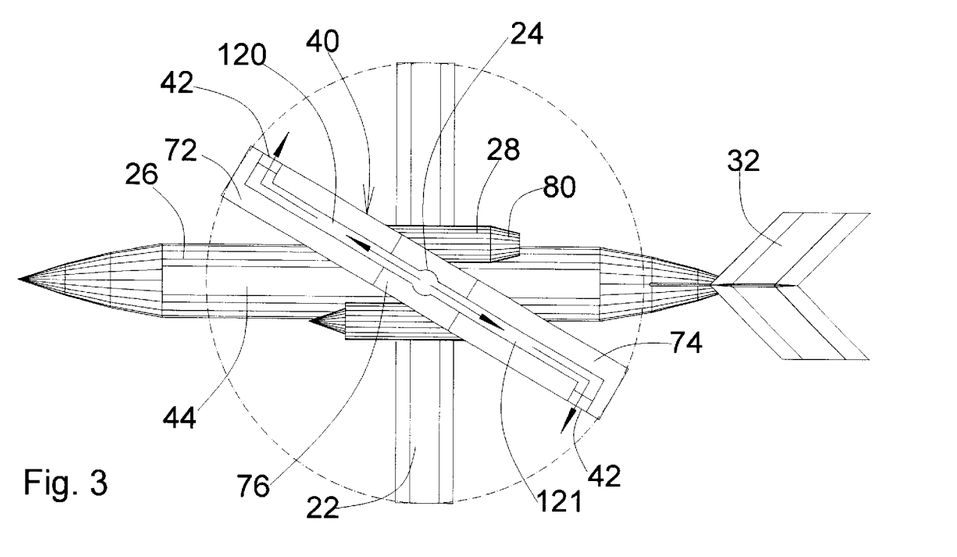
FIG. 3 is a schematic cross-sectional top plan view of the rotor/scissors wing of the aircraft shown in FIG. 1A indicating how engine exhaust gas is transported from the hollow shaft of the rotor/scissors wing to the jet nozzles of the rotor/scissors wing via flow ducts built in the rotor/scissors wing.

FIG. 3 is a schematic cross-sectional drawing indicating how engine exhaust gas is transported from shaft 24 to jet nozzles 42of rotor/scissors wing 40 via flow ducts 120 and 121 at helicopter mode. First, engine exhaust gas is directed from the engines to shaft 24 that is hollow in the center. Then, as the arrows indicate, the exhaust gas is transported to jet nozzles 42 through flow ducts 120 and 121 and finally is released from jet nozzles 42 to propel rotor/scissors wing 40 to rotate.

DETAILED DESCRIPTION OF THE INVENTION—ALTERNATIVE EMBODIMENTS

Using Turboshaft/Turbofan Convertible Engine

Figure 4:
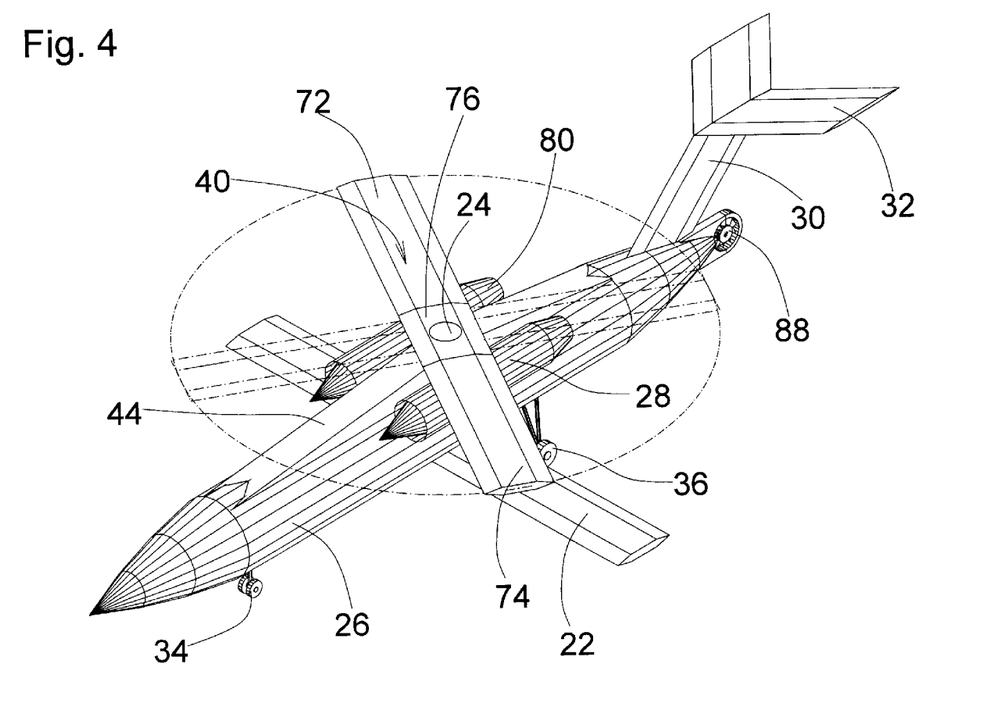
FIG. 4 shows an isometric view of an aircraft of rotor/scissors wing configuration using turboshaft/turbofan convertible engines in helicopter mode to achieve V/STOL, hovering, and low speed flying with its rotor/scissors wing rotating and scissors wing yawed to be generally perpendicular to the longitudinal axis of the fuselage of the aircraft.

FIG. 4 shows an aircraft of rotor/scissors wing configuration using turboshaft/turbofan convertible engines. Different from the aircraft indicated in FIG. 1A to FIG. 3 the aircraft shown in this figure has a fan 88 to generate anti-torque moments and does not have jet nozzles on rotor/scissors wing 40. Fan 88 works at helicopter mode and similar to rotor/scissors wing 40, it is driven by the shaft power generated by and transmitted from the turboshaft/turbofan convertible engines installed in engine nacelles 28. Besides the arrangement of fan 88 shown in FIG. 4, the fan can also be installed in other places. For example, it can be installed on vertical stabilizer 30 having blind covers on both sides of the fan so that at helicopter mode, the blinds are open and the fan works; and then at airplane mode, the blinds are closed and the fan stops working. In addition, other methods such as a tail rotor or a thruster can also be used instead of fan 88. Besides installing turboshaft/turbofan convertible engines in engine nacelles 28 and mount the engine nacelles on fairing 44 as shown in the figure, the engine or engines can also be installed at other places on the aircraft.

Similar to the rotor/scissors wing aircraft using turbofan or turbojet engines shown in FIG. 1A to FIG. 3, the aircraft using turboshaft/turbofan convertible engines can achieve the conversion from helicopter mode to airplane mode by offloading the rotating rotor/scissors wing 40 with scissors wing 22 then slow down and stop the rotation of rotor/scissors wing 40 after it is fully offloaded. Also similar to rotor/scissors wing aircraft using turbofan or turbojet engines, the aircraft using turboshaft/turbofan convertible engines can adjust the yaw angle of both rotor/scissors wing 40 and scissors wing 22 at airplane mode to maximize its flying efficiency at a wide range of speed.

Scissors Wing With Left- And Right-side Wings That Can Change Pitch Angles

Figure 5:
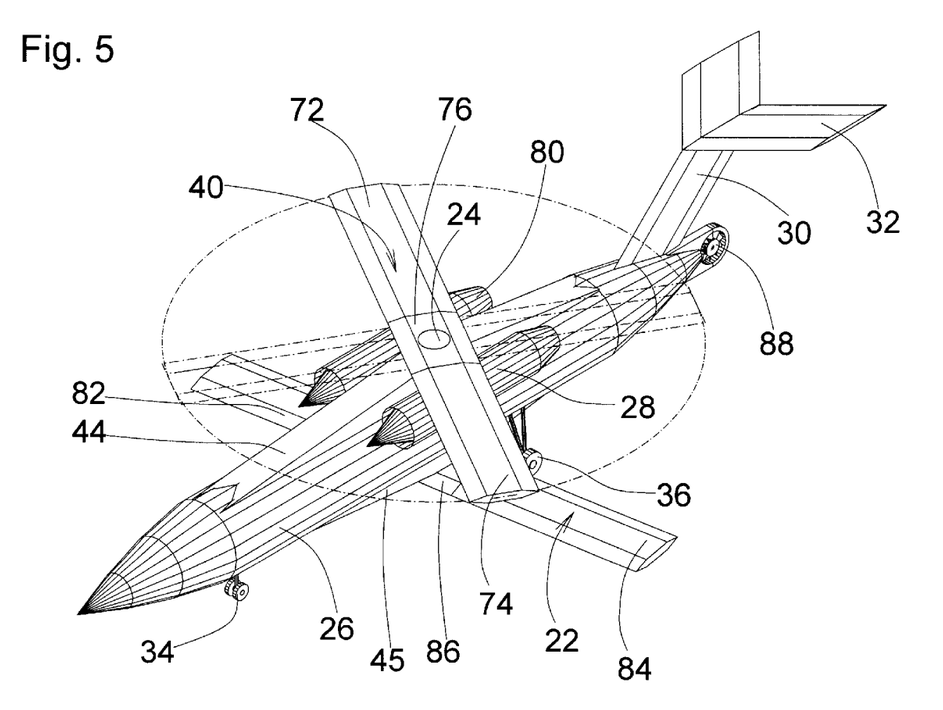
FIG. 5 shows an isometric view an aircraft of rotor/scissors wing configuration whose scissors wing has a left-side wing and a right-side wing and the pitch angles of both the left-side wing and right-side wing can be adjusted.

The aircraft in FIG. 5 has a scissors wing 22 that has a left-side wing 84 and a right-side wing 82. Both left-side wing 84 and right-side wing 82 are installed on center wing 86 in a way that the pitch angles of both left-side wing 84 and right-side wing 82 can be changed. As shown in the figure, scissors wing 22 is rotatably mounted on fuselage 26 and a fairing 45 is constructed between scissors wing 22 and fuselage 26 to reduce drag. Besides the way to install scissors wing 22 as shown in the figure, other ways can also be used to rotatably install scissors wing 22 on fuselage 26.

One object of having a scissors wing with left- and right-side wings whose pitch angles can be changed is to achieve a very smooth conversion between helicopter mode and airplane mode. When the aircraft is flying at helicopter mode, it should have a negative or a very small angle-of-attack to make the rotating rotor/scissors wing 40 pull the aircraft flying forward. However, this negative or very small angle-of-attack makes scissors wing 22 difficult to generate lift to offload the rotating rotor/scissors wing 40. One way to solve the problem is to change the pitch angle of both left-side wing 84 and right-side wing 82 so that they have positive angle-of-attack to generate lift.

Another object is to make left-side wing 84 and right-side wing 82 work together with left-side blade 74 and right-side blade 72 of rotor/scissors wing 40 to control the aircraft and adjust lift for the aircraft at airplane mode. Flying at airplane mode, both rotor/scissors wing 40 and scissors wing 22 can control the aircraft by adjusting the pitch angles of left- and right-side blade 74 and 72 and left- and right-side wing 84 and 82. These left- and right-side blades and wings can also adjust the total lift they generate by changing their pitch angles. In addition, having left- and right-side wings does not prevent scissors wing 22 from having lift-generating devices like flaps and/or flaperons and control surfaces like ailerons. These lift-generating devices can also be installed on center wing 86 to help the aircraft generate lift.

DETAILED DESCRIPTION OF THE INVENTION—CONCLUSION, RAMIFICATIONS, AND SCOPE

Accordingly, the reader will see that the rotor/scissors wing configuration can make an air vehicle achieve V/STOL and fly at a wide range of speed in an efficient and effective way. It can effectively and efficiently achieve V/STOL because the rotating rotor/scissors wing can make an air vehicle fly like a helicopter. It can effectively and efficiently fly at a wide range of speed because at airplane mode, it can maximize an air vehicle's flying efficiency by adjusting the yaw angle of both its rotor/scissor wing and scissors wing in a way similar to an air vehicle of scissors wings configuration.

Although the description in the above summary and descriptions contains many specificities, these should not be construed as limiting the scope of the invention but as merely providing illustrations of some of the presently preferred embodiments of this invention. For example, instead of having one jet nozzle 42 installed on each side of rotor/scissors wing 40 as shown in FIG. 1A to FIG. 3, two or more jet nozzles can be installed on each side of the rotor/scissors wing. On the contrary, within the scope of protection, the configuration according to the invention may also assume embodiments other than those described above. In this case, the configuration may, in particular, have features that constitute a combination of the respective individual features of the claims.

I claim:

1. An air vehicle that can fly in both helicopter mode and airplane mode and can convert from one mode to another in flight, said air vehicle comprising:
    (a) at least one fuselage means, and
    (b) a rotor/wing means, and
    (c) a wing means, and
    (d) said rotor/wing means is installed above said fuselage means and has a left-side wing means as well as a right-side wing means, and
    (e) said wing means is rotatably mounted on the fuselage means and has a left-side wing as well as a right-side wing, and
    (f) the rotor/wing means can be rotated to generate lift at helicopter mode, and
    (g) the rotation of the rotor/wing means can be stopped at airplane mode and both the rotor/wing means and wing means can be yawed in opposite directions at airplane mode, and whereby the air vehicle can achieve vertical and/or short take-off and landing at its helicopter mode and optimize its flying efficiency at various flying conditions of its airplane mode by adjusting the yaw angles of both the rotor/wing means and wing means.

2. The air vehicle of claim 1 wherein the wing means can have lift-generating devices including flaps and flaperons, and control surfaces including ailerons and spoilers.

3. The air vehicle of claim 1 wherein the left-side wing and right-side wing of the wing means can be installed on a center wing of the wing means and the pitch angles of the left-side wing and right-side wing can be changed.

4. The air vehicle of claim 1 wherein the pitch angles of the left-side wing means and right-side wing means of the rotor/wing means can be changed.

5. The air vehicle of claim 1 wherein the rotor/wing means can have lift-generating devices including flaps and flaperons, and control surfaces including ailerons and spoilers.

6. The air vehicle of claim 1 wherein a plurality of jet nozzle means are installed on the left-side wing means and right-side wing means of the rotor/wing means and at least one turbofan or turbojet engine is installed on the air vehicle.

7. The air vehicle of claim 6 wherein the exhaust gas of the at least one turbofan or turbojet engine can be directed to the rotor/wing means and released from said plurality of jet nozzle means to propel the rotor/wing means to rotate at helicopter mode.

8. The air vehicle of claim 6 wherein the wing means can generate lift to offload the rotating rotor/wing means during the conversion from helicopter mode to airplane mode and eventually the offloaded and rotating rotor/wing means can have its rotating speed slowed down and stopped so that the rotor/wing means can be locked to a specific position to make the air vehicle finish the conversion from helicopter mode to airplane mode.

9. The air vehicle of claim 6 wherein less and less exhaust gas from the at least one turbofan or turbojet engine is released from the plurality of jet nozzle means on the rotor/wing means and more and more exhaust gas from the at least one turbofan or turbojet engine is released to directly propel the air vehicle to fly forward until none exhaust gas is released from the plurality of jet nozzle means on the rotor/wing means so that the air vehicle is able to convert from helicopter mode to airplane mode.

10. The air vehicle of claim 1 wherein at least one turboshaft/turbofan convertible engine is installed on the air vehicle and an anti-torque means is also installed on the air vehicle.

11. The air vehicle of claim 10 wherein the at least one turboshaft/turbofan convertible engine can generate shaft power to rotate the rotor/wing means at helicopter mode.

12. The air vehicle of claim 10 wherein the at least one turboshaft/turbofan convertible engine also powers the anti-toque means to neutralize the rotating torque moment applied on the air vehicle generated by the rotating rotor/wing means at helicopter mode.

13. The air vehicle of claim 10 wherein the wing means can generate lift to offload the rotating rotor/wing means during the conversion from helicopter mode to airplane mode and eventually the offloaded and rotating rotor/wing means can have its rotating speed slowed down and stopped so that the rotor/wing means can be locked to a specific position to make the air vehicle finish the conversion from helicopter mode to airplane mode.

14. The air vehicle of claim 10 wherein less and less engine power from the at least one turboshaft/turbofan convertible engine is used to rotate the rotor/wing means and power the anti-torque means and more and more engine power from the at least one turboshaft/turbofan convertible engine is used to directly propel the air vehicle to fly forward until none engine power is used to drive the rotor/wing means and anti-torque means so that the air vehicle is able to convert from helicopter mode to airplane mode.

* * * * *